United States Patent Office 3,476,547
Patented Nov. 4, 1969

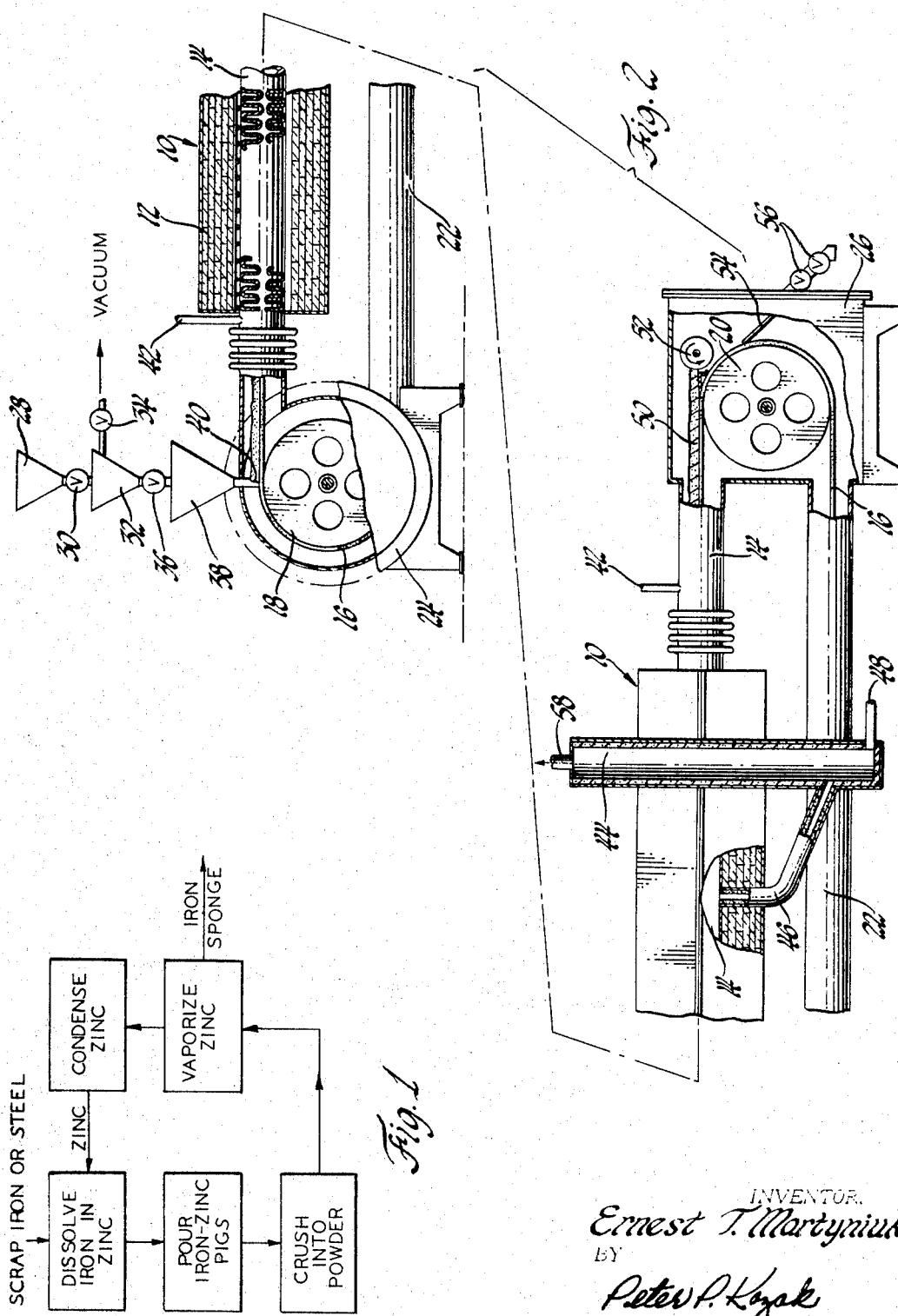

3,476,547
METHOD OF MAKING METAL POWDER
Ernest T. Martyniuk, Troy, Mich., assignor to General Motors Corporation, Detroit, Mich., a corporation of Delaware
Filed Oct. 20, 1966, Ser. No. 588,150
Int. Cl. B22f 9/00; C21b 13/00; C22f 1/08
U.S. Cl. 75—.5                     8 Claims

ABSTRACT OF THE DISCLOSURE

The invention provides a method of reducing certain soft scrap metals such as iron and copper to a useful powder form. The metallic scrap is dissolved in molten zinc and solidified to form a friable ingot which is comminuted to a fine powder. The zinc is separated from the powder by sublimation to leave a residual metal sponge which is readily comminuted to a powder of suitable size.

---

This invention relates to the production of powdered metal. More particularly, it relates to a method wherein zinc is employed to convert relatively large scrap particles of iron, ferrous-based alloy or copper into a useful powdered form.

Most methods of fabricating metals generate a certain amount of waste or scrap material. Frequently it is desirable and necessary to upgrade this scrap material by converting it into a more useful form. One common outlet for scrap metal is to convert it into a powder which is suitable for many uses, such as for example compaction and sintering into an article of commerce. However, some metals such as copper and iron are ductile or soft and cannot readily be pulverized or comminuted into powder form.

Therefore, it is an object of this invention to provide a method of converting scrap particles of ductile, non-friable metals into useful powders.

It is a more specific object of this invention to provide a method of producing metal powders for compaction into useful articles in which method a ductile metal is converted into a friable material by the formation of a suitable alloy with zinc.

A further more specific object of this invention is to provide a method wherein zinc is employed in the conversion of scrap copper, iron, or ferrous-based alloy particles into useful powders of these respective metals.

These and other objects are accomplished in accordance with my invention by dissolving a scrap metal such as iron, ferrous-based alloy, or copper in molten zinc. The molten solution is cast into an ingot which is comprised substantially of a friable zinc-solute metal alloy. This friable ingot is readily crushed to powder using available comminuting equipment. The zinc is separated from the powder by vaporization under conditions such that the residual metal is not substantially melted or excessively sintered, but is in the form of a low density sponge or sinter cake. This metal sponge is then readily reduced mechanically to a powder of desired particle size.

These and other objects of my invention will become more apparent following a detailed description thereof wherein reference will be made to the attached drawings in which:

FIGURE 1 is a flow diagram depicting my process as applied to the production of iron or ferrous alloy powder; and FIGURE 2 is an elevation view with parts broken away of vaporization apparatus suitable for separating the zinc from the alloy powders which are generated in one of the steps of my process.

It is known that molten zinc will dissolve various other metals. Since zinc melts at a relatively low temperature, about 788° F., a molten solution may be prepared using conventional heating equipment and holding vessels. This is helpful because certain particular solute metal and zinc compositions solidify to form a brittle, readily pulverizable material. Brittle alloys may be formed as for example, between zinc and copper, zinc and iron, or zinc and suitable ferrous-based alloys, which are readily comminuted into powder form. Once the friable alloy has been reduced to a powder, the zinc may be removed by vaporization to leave the desired metal in sponge form. In this regard, the boiling point of zinc (1664° F. at one atmosphere) is sufficiently low that it may be vaporized without excessively sintering or fusing the other component.

In accordance with my method it is generally preferable that as much of the ductile metal as possible be dissolved in the zinc without adversely affecting the friability of the solid ingot. In this way a minimum amount of zinc is handled through the process. At 1300–1500° F. zinc will dissolve about 10% of its weight of iron, but at about 2300° F. it will dissolve 100% of its weight of iron. Even though iron is ductile, an ingot comprised of approximately equal portions of iron and zinc is friable. With respect to copper, I have found that at about 1500° F. a molten zinc-copper solution may be prepared comprising about 39% by weight copper. Alloys containing more than about 40% copper are not suitably friable for use in this invention. When a solution of zinc and solute metal has been formed, wherein the solute metal has a boiling point substantially above that of zinc, the zinc may be separated from a solidified solution by vaporization. The vapor pressure of zinc at 1250° F. is about 60 millimeters of mercury; at 1450° F., about 100 millimeters of mercury; and at 1664° F. the vapor pressure is about 760 millimeters of mercury. In many applications of my process the zinc must be vaporized under reduced pressure to avoid fusing or excessively sintering the residual metal sponge. Should the residual metal be fused or excessively sintered, it cannot readily be reduced to powder.

A few specific examples of the application of my process will better illustrate its scope. As indicated above, it may advantageously be applied to recover iron powders from suitable ferrous-based scrap alloy compositions. FIGURE 1 is a flow diagram depicting the invention, as applied to scrap iron or steel, in concise form. A solid mixture of approximately equal weights iron scrap and zinc is added to a pressure vessel having a suitable refractory liner. It is heated by any suitable means, such as induction heating or indirect gas firing, to a temperature of about 2300–2400° F. An inert atmosphere of nitrogen is employed to maintain a pressure of about 200 lbs. p.s.i.g. over the zinc to prevent it from vaporizing. At this temperature range the zinc will dissolve all of the iron present plus small amounts of alloying elements such as nickel, chromium, molybdenum, or manganese which may be present in the scrap ferrous-based starting material. Carbon, sulfur, or phosphorous will float to the surface of the melt and may be separated when the solution is tapped and cast into ingot form. The ingot is comprised of an iron-zinc alloy which is friable. This material is crushed, milled, pulverized, or otherwise comminuted, using any of a number of types of standard, readily available crushing equipment, to a fine powder. Preferably, at least about 80 mesh powder is obtained. The iron-zinc powder is substantially uniform in composition and the zinc may now be removed to leave a residue of sponge iron or ferrous-based alloy. In order to prevent fusing of the residual iron powder, the zinc is removed by vaporization under reduced pressure. Preferably, this vaporization operation is conducted at a temperature from about 1150–1500° F. under an absolute pressure of about 1–10 millimeters of mercury.

The vaporization step requires the use of equipment of the type shown in FIGURE 2. FIGURE 2 is a schematic elevational view of apparatus which is suitable for vaporizing the zinc under relatively low absolute pressure. Referring to the drawing, a muffle furnace 10 is shown. The heat source (not shown) which may be comprised of natural gas burners, electrical heating elements, or other suitable means, is enclosed behind the refractory lining 12. A muffle 14 extends completely through the furnace and it is within this muffle that the iron-zinc brittle alloy is heated and the zinc vaporized. And endless belt 16 is employed to transport the alloy powders into the hot chamber and to remove the residual iron sponge therefrom. A driver wheel 18 and an idler wheel 20 drive and support endless belt 16 as it moves through the muffle 14 and return conduit 22. The muffle 14, return conduit 22 and end chambers 24 and 26 define a space within the apparatus 10 which in operation, is maintained at relatively low absolute pressure by means which will be described below. The finely divided iron-zinc alloy is introduced into the apparatus through an interlocking system of hoppers communicating with chamber 24. The powder is first charged to hopper 28 which is at atmospheric pressure. When the hopper is full, valve 30 is opened and the material flows into hopper 32 which is initially at atmospheric pressure. When the material has emptied from hopper 28 into hopper 32, valve 30 is closed and valve 34, which connects hopper 32 to a vacuum source, is opened. The vacuum source which is not shown is employed to reduced the pressure within hopper 32 to that existing within the muffle 14 and connecting chambers. When the pressure within hopper 32 has been reduced to about 1–10 millimeters of mercury, valve 36 is opened and the material then is dropped into hopper 38 which in operation is maintained at about the pressure of the muffle 14. From hopper 38 the incoming powder is distributed evenly on the belt 16 by means of gate 40. The iron-zinc powder is preferably distributed on the belt in thicknesses up to about 2″. The moving belt carries the powder into the muffle 14 and the hot chamber of the furnace. The powder is initially heated to a temperature of about 1000–1100° F. and subsequently, as it slowly moves on into the furnace, further heated to the vaporization temperature at which zinc vaporizes and is carried from the hot chamber. An inert or reducing sweep gas such as helium, argon, hydrogen or carbon monoxide is introduced at openings 42 at either end of the furnace. The sweep gas is employed to direct the zinc vapors toward condenser 44. The zinc vapors and carrier gas leave muffle 14, flowing through conduit 46 into the condenser 44. In the condenser 44 the zinc vapor is liquefied and accumulated to a barometric height at which time it is continuously withdrawn from the condenser through conduit 48. The residue on the continuous belt 16, after the zinc has been vaporized, is an iron sponge or sinter cake mat indicated at 50. The original powder is slightly sintered during the zinc vaporization to form a residual iron sponge which is very porous and readily pulverized into fine powder form. In the embodiment shown, the iron sponge 50 is pulverized by rotating wheel 52 in chamber 26 and the powders flow down the slide 54. They are removed from the furnace through interlocking valves indicated at 56 which are similar in operation to the above-described interlocking hopper system. The iron sponge could, alternatively, be pulverized outside the vaporization apparatus by employing a wire brush, hammer mill, or the like.

The sweep gases which are employed to direct the zinc vapor to the condenser 44 are exited from the condenser to the vacuum source through conduit 58. This vacuum source (not shown) not only withdraws the sweep gases but, of course, maintains the absolute pressure within the muffle furnace at a suitably low level preferably in the range of from 1–10 millimeters of mercury.

The invention may be employed to recover iron powder from plain carbon steel, cast iron, and ferrous-based compositions containing other alloying elements, such as nickel, chromium, manganese, and molybdenum. Moreover, if it is desired to produce iron alloy powder from an alloy-free scrap material, small amounts of alloying elements may be added to scrap iron-zinc mixture before dissolution. The alloy additions will dissolve in the molten iron and zinc and be carried through the process with the iron. Iron alloy powders have been prepared by this method. In different experiments iron alloy powders containing 0.1% to 5% by weight nickel, 0.1% to 5% by weight chromium, 0.1% to 0.8% by weight molybdenum, and 0.1% to 1% by weight manganese have been obtained.

Essentially the same dissolution, comminuting, and vaporization equipment is employed when copper scrap is recovered by converting it into copper powder. The only substantial differences are in process variables. A solid mixture of copper and zinc comprising 35–39% by weight copper, is added to a suitable melting vessel. The mixture is heated to a maximum temperature of about 1600° F. at which point a complete solution is obtained. The solution is cast into a friable ingot and comminuted as described above. The vaporization of the zinc from the powdered copper-zinc alloy proceeds substantially as outlined in the production of iron powders. However, because the copper is softer than iron it is preferred that the mat of powder deposited on the endless belt of the vaporization apparatus be maintained at ¾″ or less. At these thicknesses the hot copper sponge will not sinter excessively under its own weight. As in the production of iron powder, the zinc vaporization is preferably effected below a maximum temperature of 1500° F. and a pressure of 1–10 millimeters of mercury.

Metal powders produced by this invention may be used in many useful applications such as in pigments in painting or printing media, in coating which are applied by hot spraying or from a fluidized bed, in catalysts or catalyst supports, and the like. Another use for the product of my invention is in powder metallurgy techniques whereby useful articles of commerce are produced by compacting and sintering. These techniques are well known to those skilled in the art and need not be described here. It should be pointed out that however powders produced by this invention, particularly iron powders, do not need to be annealed prior to subsequent compaction and sintering as is required in other processes wherein direct pulverization is attempted.

My process has now been described in terms of employing zinc as a carrier metal to recover iron and copper powders. Of course, it may be employed to recover other metals which are soluble in zinc and form a similar brittle, readily pulverizable alloy.

Therefore, while my process has been defined and described in terms of a few preferred embodiments, it will be recognized by those skilled in the art that other forms may readily be adopted. Therefore, the scope of my invention should be considered limited only by the following claims.

I claim:
1. A method of producing a powdered metal, comprising the steps of dissolving said metal in molten zinc, solidifying the resulting solution of said metal and zinc to form a friable ingot, comminuting said friable ingot to a fine powder, separating said zinc from said powder by vaporization substantially without melting or excessively sintering said powder to form a readily pulverizable porous metal sponge and reducing said residual metal sponge to a desired particle size.

2. A method of producing iron powder from ferrous metal comprising the steps of heating a mixture, comprising up to about 50% by weight ferrous metal and the balance zinc, at a temperature sufficient to dissolve at least the iron component of said ferrous metal in said zinc and at a pressure sufficient to prevent the vaporization of said zinc, casting said iron-zinc solution into a friable ingot, comminuting said ingot into powder, separating said zinc from said power by vaporization substantially without melting or excessively sintering said powder to leave a readily pulverizable porous ferrous metal sponge, and reducing said sponge to a powder of desired particle size.

3. A method as in claim 2 wherein said iron-zinc solution comprises minor proportions of metals taken from the group consisting of nickel, chromium, molybdenum, and manganese.

4. A method as in claim 2 wherein said mixture comprises 40% to 50% by weight ferrous-based metal and wherein said solution is obtained by heating said mixture to a temperature of 2300–2400° F. under a pressure of about 200 p.s.i.g.

5. A method as in claim 2 wherein said zinc is vaporized at a maximum temperature of about 1500° F. and under an absolute pressure of one to ten millimeters of mercury.

6. A method of producing copper powder from cuprous metal comprising the steps of heating a mixture of up to about 40% by weight copper and the balance zinc to a temperature sufficient to obtain a solution of the copper in said zinc, casting said copper-zinc solution into a friable ingot, comminuting said ingot into a powder, separating the zinc from said powder by vaporization substantially without melting or excessively sintering said powder to leave a readily pulverizable porous copper sponge, and reducing said copper sponge to a powder of desired particle size.

7. A method as in claim 6 wherein said mixture comprises about 35% to 39% by weight copper and the balance zinc and said mixture is heated to about 1600° F. to obtain said solution.

8. A method as in claim 6 wherein said zinc is vaporized at a maximum temperature of about 1500° F. and under an absolute pressure of one to ten millimeters of mercury.

References Cited

UNITED STATES PATENTS

| 1,814,072 | 7/1931 | Bakken | 75—67 |
| 2,895,819 | 7/1959 | Fiedler | 75—20 |

FOREIGN PATENTS

| 938,219 | 10/1963 | Great Britain. |

L. DEWAYNE RUTLEDGE, Primary Examiner

T. R. FRYE, Assistant Examiner

U.S. Cl. X.R.

75—20, 83, 88